US009556291B2

(12) United States Patent
Van Egmond et al.

(10) Patent No.: US 9,556,291 B2
(45) Date of Patent: Jan. 31, 2017

(54) GAS-PHASE POLYMERIZATION PROCESS WITH WET ZONE

(71) Applicant: W. R. Grace & Co.-Conn., Columbia, MD (US)

(72) Inventors: Jan W. Van Egmond, Charleston, WV (US); Daniel J. Chismar, Charlestown, WV (US); Jeffrey D. Goad, Barboursville, WV (US)

(73) Assignee: W. R. Grace & Co.-Conn., Columbia, MD (US)

(*) Notice: Subject to any disclaimer, the term of this patent is extended or adjusted under 35 U.S.C. 154(b) by 0 days.

(21) Appl. No.: 15/021,561

(22) PCT Filed: Sep. 11, 2014

(86) PCT No.: PCT/US2014/055074
§ 371 (c)(1),
(2) Date: Mar. 11, 2016

(87) PCT Pub. No.: WO2015/038696
PCT Pub. Date: Mar. 19, 2015

(65) Prior Publication Data

US 2016/0229933 A1 Aug. 11, 2016

Related U.S. Application Data

(60) Provisional application No. 61/877,092, filed on Sep. 12, 2013.

(51) Int. Cl.

| | |
|---|---|
| ***C08F 2/00*** | (2006.01) |
| ***C08F 210/00*** | (2006.01) |
| ***C08F 110/06*** | (2006.01) |
| ***C08F 2/34*** | (2006.01) |

(52) U.S. Cl.
CPC ................ *C08F 110/06* (2013.01); *C08F 2/34* (2013.01)

(58) Field of Classification Search
CPC ........... C08F 2/34; C08F 110/06; C08F 10/06; C08F 210/06; C08F 210/16
USPC ............................................ 526/68, 72, 348
See application file for complete search history.

(56) References Cited

U.S. PATENT DOCUMENTS 6,391,985 B1 * 5/2002 Goode .................... B01J 8/003 526/348

FOREIGN PATENT DOCUMENTS

| | | | |
|---|---|---|---|
| EP | 1041087 | A2 | 10/2000 |
| WO | 2004092228 | A1 | 10/2004 |

OTHER PUBLICATIONS

International Search Report for Application No. PCT/US2014/055074 dated Nov. 20, 2014.

* cited by examiner

*Primary Examiner* — William Cheung
(74) *Attorney, Agent, or Firm* — Lerner, David, Littenberg, Krumholz & Mentlik, LLP

(57) ABSTRACT

The present disclosure is directed to a process for producing olefin-based polymer in a gas phase polymerization reactor. The process includes forming a wet zone in the gas phase polymerization reactor. The wet zone is formed by maintaining a temperature less than or equal to the fluidizing medium dew point temperature+2° C. in a region of the reactor. The region is defined as the region extending from the distributor plate to 2.5 meters above the distributor plate. Injection of a high activity catalyst composition in the wet zone produces olefin-based having a settled bulk density greater than 23.5 lb/ft3.

8 Claims, 5 Drawing Sheets

EXAMPLE 1:
AT POINTS D AND E LOCATED LOWER THAN 2.5 m ABOVE THE DISTRIBUTOR PLATE, THE TEMPERATURE IS MORE THAN 2 C ABOVE THE DEW POINT TEMPERATURE.
THE SETTLED BULK DENSITY IS LOW, 23.36 lb/$ft^3$.

EXAMPLE 2:
ALL THE POINTS (A, B, C, D) LOWER THAN 2.5 m ABOVE THE DISTRIBUTOR PLATE HAVE A TEMPERATURE THAT IS LESS THAN 2 C ABOVE THE DEW POINT TEMPERATURE.
THE SETTLED BULK DENSITY IS HIGH, 25.76 lb/$ft^3$.

EXAMPLE 3:
ALL THE POINTS (A, B, C, D) LOWER THAN 2.5 m ABOVE THE DISTRIBUTOR PLATE HAVE A TEMPERATURE THAT IS LESS THAN 2 C ABOVE THE DEW POINT TEMPERATURE.
THE SETTLED BULK DENSITY IS HIGH, 25.78 lb/$ft^3$.

EXAMPLE 4:
ALL THE POINTS (A, B, C, D) LOWER THAN 2.5 m ABOVE THE DISTRIBUTOR PLATE HAVE A TEMPERATURE THAT IS LESS THAN 2 C ABOVE THE DEW POINT TEMPERATURE.
CATALYST INJECTION POINT IS NOT WITHIN THE WET ZONE.
THE SETTLED BULK DENSITY IS LOW, 20.1 lb/ft$^3$.

GAS-PHASE POLYMERIZATION PROCESS WITH WET ZONE

CROSS-REFERENCE TO RELATED APPLICATIONS

The present application is a national phase entry under 35 U.S.C. §371 of International Application No. PCT/US2014/055074 filed Sep. 11, 2014, published in English, which claims priority from U.S. Provisional Patent Application No. 61/877,092 filed Sep. 12, 2013, all of which are incorporated herein by reference.

BACKGROUND

The present disclosure relates to processes for producing polymers and gas-phase polymerization of olefins in particular.

Gas-phase polymerization is a known process for producing polymers. Gas-phase polymerization production efficiencies move toward the maximization of the polymer production rate. When the volume of the gas-phase reactor is fixed, an increase of the reactor inventory is one approach toward production maximization. Reactor inventory can be increased by increasing the bulk density of the fluidized bed (i.e., increasing the fluidized bulk density).

Attempts to manipulate fluidized bed parameters for increased productivity carry a high degree of uncertainty. Control of the fluidized bed bulk density is complex and difficult. The bulk density of the fluidized bed is a complicated interplay between many operational parameters such as upper/lower bed pressure/weight; bed height; bed temperature; gas pressure, composition, and flow rate; particle morphology; bed settled bulk density; and fluidization regime. It is difficult to prepare a fluidized bed model that captures all these parameters and accurately predicts fluidized bulk density characteristics under actual operating conditions. Such uncertainty poses the risk of sheeting, chunking, fouling, bed collapse, and/or reactor shutdown. The benefit of polymer production maximization by way of manipulation of the fluidized bulk density is balanced against these risks.

Desirable would be a gas-phase polymerization process that increases the settled bulk density of the fluidized bed and simultaneously avoids sheeting, chunking, overheating, bed collapse, and/or reactor shutdown.

SUMMARY

The present disclosure is directed to processes for increasing the settled bulk density (SBD) of the fluidized bed in a gas-phase polymerization reactor. Applicant discovered that creation of a wet zone in a gas phase polymerization reactor unexpectedly increases the SBD of the fluidized bed when utilizing high activity catalyst composition. The present process improves polymer production by increasing the settled bulk density of the fluidized bed. The SBD is increased with reduced risk, or no risk, of sheeting, chunking, overheating, bed collapse and/or reactor shutdown.

In an embodiment, a process for producing olefin-based polymer is provided. The process occurs in a gas phase polymerization reactor. The gas phase polymerization has a distributor plate and a fluidizing medium. The fluidizing medium has a dew point temperature (DPT) and is composed of one or more olefin monomers and from 5 wt % to 25 wt % of a condensed liquid. The process includes forming, in the reactor, a wet zone. The wet zone is formed by maintaining a temperature less than or equal to the DPT+2° C. in a region of the reactor. The region is defined as the region extending from the distributor plate to 2.5 meters above the distributor plate. The process includes injecting a catalyst composition into the wet zone. The catalyst composition has a catalyst activity greater than 50 ton/kg. The process includes contacting, in the wet zone under gas phase polymerization conditions, the catalyst composition with the one more monomers of the fluidizing medium. The process includes forming particles of olefin-based polymer having a settled bulk density greater than 23.5 $lb/ft^3$.

An advantage of the present disclosure is the ability to increase productivity by increasing the setted bulk density of the fluidized bed.

An advantage of the present disclosure is the ability to increase the settled fluidized bulk density with little or no risk of sheeting, chunking, overheating, bed collapse and/or reactor shutdown.

An advantage of the present disclosure is a gas-phase polymerization process with improved productivity that requires no increase in reactor residence time.

DETAILED DESCRIPTION

Figure 1:
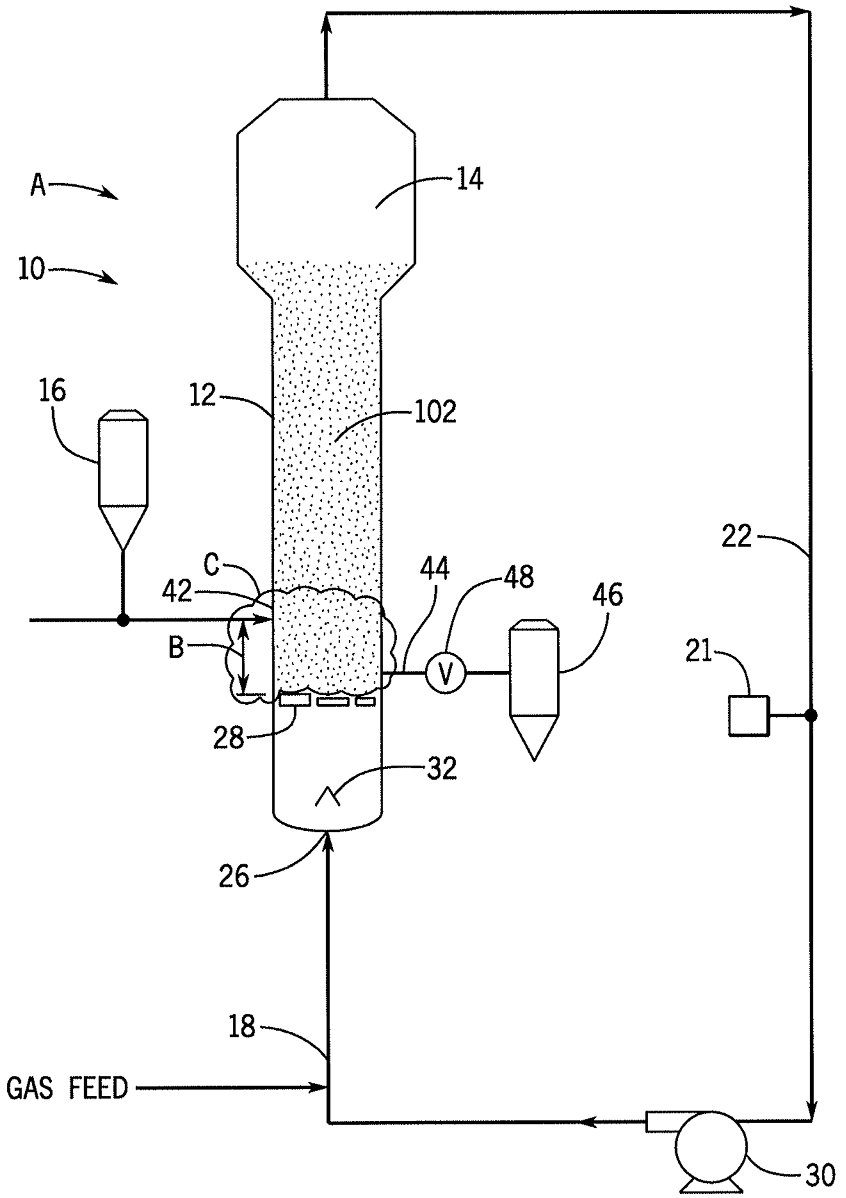
FIG. 1 is a schematic representation of a gas-phase polymerization system in accordance with an embodiment of the present disclosure.

The present disclosure provides a process for producing olefin-based polymer in a gas phase polymerization reactor. The gas phase polymerization has a distributor plate and a fluidizing medium. The fluidizing medium has a dew point temperature (DPT) and is composed of one or more olefin monomers and from 5 wt % to 25 wt % of a condensed liquid. The process includes forming, in the reactor, a wet zone. The wet zone is formed by maintaining a temperature less than or equal to the DPT+2° C. in a region of in the reactor. The region is defined as the region extending from the distributor plate to 2.5 meters above the distributor plate. The process includes injecting a catalyst composition into the wet zone. The catalyst composition has a catalyst activity greater than 50 ton/kg. The process includes contacting, in the wet zone under gas phase polymerization conditions, the catalyst composition with the one more monomers of the fluidizing medium. The process includes forming particles of olefin-based polymer having a settled bulk density greater than 23.5 $lb/ft^3$.

As used herein, "gas-phase polymerization" (or "gas-phase polymerization conditions") is the passage of an ascending fluidizing medium, the fluidizing medium containing one or more monomers, in the presence of a catalyst through a fluidized bed of polymer particles maintained in a fluidized state by the fluidizing medium. "Fluidization," "fluidized," or "fluidizing" is a gas-solid contacting process in which a bed of finely divided polymer particles is lifted and agitated by a rising stream of gas. Fluidization occurs in a bed of particulates when an upward flow of fluid through the interstices of the bed of particles attains a pressure differential and frictional resistance increment exceeding particulate weight. Thus, a "fluidized bed" is a plurality of polymer particles suspended in a fluidized state by a stream of a fluidizing medium. A "fluidizing medium" is one or more olefin gases, optionally a carrier gas (such as $H_2$ or $N_2$) and optionally a liquid (such as a hydrocarbon) which ascends through the gas-phase reactor.

A typical gas-phase polymerization reactor (or gas phase reactor) includes a vessel (i.e., the reactor), the fluidized bed, a distributor plate, an inlet and an outlet piping, a compressor, a cycle gas cooler or heat exchanger, and a product discharge system. The vessel includes a reaction zone and a velocity reduction zone, each of which is located above the distributor plate. The fluidized bed is located in the reaction zone. The fluidizing medium passes through the gas-phase polymerization reactor at a velocity sufficient to maintain the bed of solid particles in a suspended condition. The gaseous stream containing unreacted gaseous monomer is withdrawn from the reactor continuously, compressed, cooled and recycled into the reactor. Product is withdrawn from the reactor and make-up monomer is added to the recycle stream.

In an embodiment, the fluidizing medium includes propylene monomer gas and at least one other gas such as an olefin and/or a carrier gas such as hydrogen or nitrogen.

Many operational parameters are monitored and controlled during gas-phase polymerization. One parameter is fluidized bulk density. The "fluidized bulk density" (or "FBD") is the weight of solid (i.e., polymer particles) per unit volume in the fluidized bed. FBD is a mean value which may be greater or less than the localized bulk density at any point in the fixed reactor portion. FBD is a direct indicator of a gas phase reactor's operating health. Unexpected changes in FBD often indicate that the reactor is experiencing problems. The FBD can include an upper fluidized bulk density (UFBD) and a lower fluidized bulk density (LFBD).

Catalyst is typically fed into a lower section of the reactor. Reaction occurs upon contact between the catalyst and the fluidizing medium yielding growing polymer particles. The fluidizing medium passes upward through the fluidized bed, providing a medium for heat transfer and fluidization. The reactor includes an expanded section located above the reaction section. In the expanded section, particles having a terminal velocity higher than the velocity of the fluidizing medium disentrain from the fluidizing medium stream. After leaving the reactor, the fluidizing medium passes through a compressor and one or more heat exchangers to remove the heat of polymerization before it is re-introduced into the reaction section of the reactor. The fluidizing medium may or may not contain an amount of liquid after cooling and condensing.

One or more olefin monomers can be introduced in the gas-phase reactor to react with the catalyst and to form a polymer, or a fluidized bed of polymer particles. Nonlimiting examples of suitable olefin monomers include ethylene, propylene, $C_{4-20}$ α-olefins, such as $C_{4-12}$ α-olefins such as 1 butene, 1-pentene, 1 hexene, 4-methyl-1-pentene, 1-heptene, 1-octene, 1-decene, 1-dodecene and the like; $C_{4-20}$ diolefins, such as 1,3-butadiene, 1,3-pentadiene, norbornadiene, 5-ethylidene-2-norbornene (ENB) and dicyclopentadiene; $C_{8-40}$ vinyl aromatic compounds including styrene, o-, m-, and p-methylstyrene, divinylbenzene, vinylbiphenyl, vinylnapthalene; and halogen-substituted $C_{8-40}$ vinyl aromatic compounds such as chlorostyrene and fluorostyrene.

In an embodiment, and with reference to FIG. 1, a process for producing olefin-based polymer in a gas-phase polymerization reactor is provided. The present process embodies commercial-scale gas-phase polymerization (A) which includes a gas-phase polymerization reactor 10 having a reaction zone 12 and a velocity reduction zone 14. The reaction zone 12 includes a fluidized bed 102 of growing polymer particles, formed polymer particles, and a minor amount of catalyst particles fluidized by the continuous flow of polymerizable and modifying gaseous components in the form of make-up feed and recycle fluid through the reaction zone 12.

The gas-phase polymerization (A) also includes catalyst, olefin monomer (such as propylene), optional comonomer(s) (ethylene, butene), and other reactants which are fed continuously to the reaction zone 12, yielding particles of olefin-based polymer (such as propylene-based polymer) in granular or in powder form. A fluidizing medium passes through the gas phase polymerization reactor 10.

In an embodiment, the fluidizing medium is composed of propylene, a hydrocarbon (such as propane or isopentane), and at least one other gas, such as hydrogen or nitrogen. In a further embodiment, the fluidizing medium includes from 75 wt % to 95 wt % propylene, from 5 wt %, to 10 wt %, or 15 wt %, or 20 wt %, or 25 wt % a hydrocarbon (such as propane), hydrogen gas, or nitrogen gas, or both hydrogen gas and nitrogen gas. The propane forms the condensed liquid of the fluidizing medium. The fluidizing medium has a dew point temperature. The term "dew point," as used herein, is the temperature (at a given pressure) at which the hydrocarbon begins to condense out of the fluidizing medium. The temperature at which liquid condensate begins to form in the fluidizing medium is influenced by the partial pressures of the individual gases that form the fluidized medium.

The catalyst used in the fluidized bed can be fed into the reactor 10 in the form of solid particles, slurry, or liquid. For example, the solid catalyst may be stored in reservoir 16 under a blanket of inert gas and introduced into the reaction zone 12 at point 42. The particles of polymer product are removed intermittently at point 44 and enter product discharge tank 46 through valve 48.

The portion of the fluidizing medium which does not react in the fluidized bed 102 constitutes a recycle fluid which is removed from the polymerization zone, by passing it into velocity reduction zone 14 above the reaction zone 12, where entrained particles are given an opportunity to drop back into the dense fluidized bed.

Reactants in the vapor phase are continuously cycled from the reaction zone 12, through the velocity reduction zone 14, through a compressor 30 and a heat exchanger and back through the fluidized bed. The temperature of the fluidized bed 102 is controlled at an essentially constant temperature, or constant temperature, under steady state conditions by constantly removing the heat of reaction by way of the cycle gas flow. The cycle gas flow also serves to fluidize the reaction bed for good back mixing. The cycle gas flow also supplies the reactants to reaction sites.

Make-up fluid is fed to recycle line 22, for example, at point 18. The composition of the make-up stream (such as fresh monomer, such as propylene for example) is determined by gas analyzer 21. Gas analyzer 21 determines the composition of the recycle stream and the composition of the make-up stream is adjusted accordingly to maintain a steady-state gaseous composition within the reaction zone 12.

The fluidizing medium is composed of make-up monomer and the recycle fluid. The recycle fluid contains a condensed liquid. The fluidizing medium is returned through recycle line 22 to reactor 10 at point 26 below the fluidized bed 102. Gas distributor plate 28 is provided above point 26 to aid in fluidizing the fluidized bed 102. In passing through the fluidized bed 102, the fluidizing medium (and the condensed liquid of the recycle fluid in particular) absorbs the heat of reaction generated by the polymerization reaction. The absorption of reaction heat results in the temperature rise of fluidizing medium and the vaporization of the liquid portions of the recycle fluid.

The recycle fluid is then compressed in compressor 30 and then passed through a heat exchange zone wherein the heat of reaction is removed before it is returned to the reaction zone 12.

The present process includes forming, in the reactor, a wet zone. The wet zone is formed (i) by maintaining a temperature less than or equal to the DPT+2° C. (ii) in a region of the reactor. The region is defined as the region extending from the distributor plate to 2.5 meters above the distributor plate (hereafter referred to as the "Region"). In other words, the "Region" aspect of the wet zone can be considered a cylindrical-shaped volume defined by the reactor interior surface and extending from the distributor plate (0 meters) to 2.5 meters above the distributor plate. The Region for the wet zone is shown as area C in FIG. 1.

The process includes injecting a catalyst composition into the wet zone. The catalyst composition has a catalyst activity greater than 50 ton/kg. The catalyst composition is introduced into the wet zone at injection point 42. Distance (B) in FIG. 1 shows the distance, or length, between the gas distributor plate 28 and the injection point 42. The distance (B) has a length of 0 meters (m) (at the distributor plate, or greater than 0 meters, or 0.5 m, or 1.0 m, or 1.5 m, to 2.0 m, or 2.5 m. In an embodiment, the distance (B) is from 0.5 m to less than or equal to 2.5 m. In a further embodiment, the injection point is 2.0 m above the distributor plate.

The catalyst composition is a "high activity catalyst" (or "HAC catalyst") and has a catalyst activity greater than 50 ton/kg. Catalyst activity is measured by mass balance. In an embodiment, the catalyst composition has a catalyst activity from greater than 50 ton/kg to 70 ton/kg.

The process includes contacting the catalyst composition with the one or more olefin monomers (such as propylene) present in the fluidizing medium. The contacting step occurs in the wet zone. The contact occurs under gas-phase polymerization conditions and produces olefin-based (such as propylene-based) polymer particles. Polymerization continues as the fluidizing medium carries the forming olefin-based polymer particles upward and out of the wet zone.

Known is the inverse relationship between catalyst activity for HAC catalysts and particle settled bulk density. As catalyst activity increases, the heat of reaction and the rate of polymerization similarly increase. The stress imparted by HAC catalysts causes the forming polymer particles to burst, break, and crack. The result is a fluidized bed with particle fines, irregular particle shape, and inconsistent particle size—each of which diminishes (i.e., reduces) the settled bulk density. Consequently, as catalyst activity increases, settled bulk density decreases.

The present process includes forming a wet zone which includes maintaining the temperature in the Region at or below the dew point temperature (DPT) plus 2° C. This temperature ceiling is referred to as "less than or equal to DPT+2° C." or simply "DPT+2° C." For example, if the DPT of the fluidizing medium is 68° C., then the process includes maintaining the temperature in the wet zone to less than or equal to 70° C. (68° C. (DPT)+2° C.=70° C.). The temperature ceiling of DPT+2° C. is maintained in the wet zone during the contact between the HAC catalyst composition and the olefin monomer(s). In other words, the process includes maintaining the reactor temperature in the wet zone to less than or equal to DPT+2° C. as the HAC catalyst composition is injected into the wet zone and as the HAC catalyst composition contacts the olefin monomer(s), triggering polymerization.

The DPT+2° C. temperature ceiling is achieved by (i) adjustment of the bed temperature set point, (ii) adjustment of the condensing level, (iii) adjustment of the bed-minus-dew or "bed-dew" criteria, and (iv) any combination of (i)-(iii). The wet zone remains cool during HAC catalyst composition injection by the presence of condensed liquid. The temperature profile in the wet zone is determined by a balance between the heat of polymerization and the latent heat through evaporation of condensed liquid. Above the wet zone, the temperature profile is characterized by rapid increase in temperature with increasing heat above the distributor plate and is dominated by the balance between the heat of polymerization and the heat of the fluidizing gas.

The process further includes forming particles of olefin-based polymer having a settled bulk density ("SBD") greater than 23.5 $lb/ft^3$. In an embodiment, the process includes forming particles of olefin-based polymer having a SBD greater than 23.5 $lb/ft^3$, or 24.0 $lb/ft^3$ or 25.0 $lb/ft^3$ or 26.0 $lb/ft^3$ to 27.0 $lb/ft^3$, or 28.0 $lb/ft^3$, or 29.0 $lb/ft^3$, or 30.0 $lb/ft^3$.

The present process advantageously improves (i.e., increases) SBD of the fluidized bed produced by way of gas-phase polymerization utilizing HAC catalyst composition. Polymer particles with increased (greater) SBD are desired because an increase in SBD enables increased throughput and increased catalyst productivity in the polymerization reactor. Throughput of units downstream of the reactor is also determined by settled bulk density. These units include the product discharge system, the product purge bin, rotary feeders. Higher SBD reduces the amount of unreacted monomer carried with the polymer product. An increase in SBD also improves product discharge from the reactor and increases residence time in the product purge bin. Both of these effects yield lower volatile organic compounds (VOC's) and oligomers in the final polymer product.

Applicant discovered that (1) formation of the wet zone, (2) injection of HAC catalyst composition into the wet zone, and (3) maintaining the wet zone at or below DPT+2° C. unexpectedly improves polymer particle morphology. The particle morphology is more consistent, exhibiting uniformity in particle size and uniformity in particle shape, with less breakage, less fracture, and less burst. Bounded by no particular theory, it is believed that the provision of parameters (1)-(3) enables absorption of more latent heat of reaction than in conventional gas phase polymerization systems utilizing a HAC catalyst composition. Absorption of heat reduces reaction stress upon the formant polymer particle. The reduction in reaction stress reduces breakage and fractures of formant polymer particles and correspondingly increases the average particle size of particles produced in wet zone. The increase in average particle size increases SBD.

In an embodiment, the process includes injecting the HAC catalyst composition into the wet zone at a height where the reactor temperature is from 60° C., or 62° C., or 64° C., or 66° C., 68° C., or 70° C., or 72° C., to 74° C., or 76° C., or 77° C. In other words, the temperature at the injection point 42 is from 60° C. to 77° C.

In an embodiment, the process includes injecting the catalyst composition in the wet zone when the DPT is from 60° C., or 62° C., or 64° C., or 66° C., 68° C., or 70° C., or 72° C., to 74° C., or less than 75° C.

In an embodiment, the fluidizing medium includes from 75 wt % to 95 wt % propylene monomer and from 5 wt % to 25 wt % condensed liquid phase. The process includes forming particles of propylene homopolymer having a settled bulk density from 23.5 lb/ft$^3$ to 27 lb/ft$^3$.

In an embodiment, the fluidizing medium includes from 75 wt % to 95 wt % propylene monomer and from 5 wt % to 25 wt % condensed liquid propane. The process includes forming particles of propylene homopolymer having a settled bulk density from 24.0 lb/ft$^3$ to 30 lb/ft$^3$.

In an embodiment, the fluidizing medium includes from 75 wt % to 95 wt % propylene monomer and from 5 wt % to 25 wt % condensed liquid propane. The HAC catalyst composition is a Ziegler-Natta catalyst composition having an internal electron donor composed of a substituted phenylene aromatic diester (ZN-SPAD catalyst). The process includes contacting the ZN-SPAD catalyst with the propylene and forming particles of propylene homopolymer having a settled bulk density greater than 25.0 lb/ft$^3$. In an embodiment, the process includes forming particles of propylene homopolymer having a settled bulk density greater than 25.0 lb/ft$^3$ to 28 lb/ft$^3$.

The ZN-SPAD catalyst composition is a HAC catalyst composition and includes an internal electron donor comprising a substituted phenylene aromatic diester. The Ziegler-Natta catalyst composition includes a procatalyst composition, and may optionally include a cocatalyst, an external electron donor, and an activity limiting agent. The procatalyst composition includes a combination of a magnesium moiety, a titanium moiety and an internal electron donor. The internal electron donor includes a substituted phenylene aromatic diester (or "SPAD").

The procatalyst composition is produced by halogenating/titanating a procatalyst precursor in the presence of the internal electron donor. As used herein, an "internal electron donor" is a compound added or otherwise formed during formation of the procatalyst composition that donates at least one pair of electrons to one or more metals present in the resultant procatalyst composition. The internal electron donor is the substituted phenylene aromatic diester. Not wishing to be bound by any particular theory, it is believed that during halogenation and titanation the internal electron donor (1) regulates the formation of active sites, (2) regulates the position of titanium on the magnesium-based support and thereby enhances catalyst stereoselectivity, (3) facilitates conversion of the magnesium and titanium moieties into respective halides and (4) regulates the crystallite size of the magnesium halide support during conversion. Thus, provision of the internal electron donor yields a procatalyst composition with enhanced stereoselectivity.

The procatalyst precursor may be a magnesium moiety compound (MagMo), a mixed magnesium titanium compound (MagTi), or a benzoate-containing magnesium chloride compound (BenMag). In an embodiment, the procatalyst precursor is a magnesium moiety ("MagMo") precursor. The "MagMo precursor" contains magnesium as the sole metal component. The MagMo precursor includes a magnesium moiety. Nonlimiting examples of suitable magnesium moieties include anhydrous magnesium chloride and/or its alcohol adduct, magnesium alkoxide or aryloxide, mixed magnesium alkoxy halide, and/or carbonated magnesium dialkoxide or aryloxide. In one embodiment, the MagMo precursor is a magnesium di($C_{1-4}$)alkoxide. In a further embodiment, the MagMo precursor is diethoxymagnesium.

In an embodiment, the procatalyst precursor is a mixed magnesium/titanium compound ("MagTi"). The "MagTi precursor" has the formula $Mg_dTi(OR^e)_fX_g$ wherein $R^e$ is an aliphatic or aromatic hydrocarbon radical having 1 to 14 carbon atoms or COR' wherein R' is an aliphatic or aromatic hydrocarbon radical having 1 to 14 carbon atoms; each $OR^e$ group is the same or different; X is independently chlorine, bromine or iodine, preferably chlorine; d is 0.5 to 56, or 2 to 4; f is 2 to 116 or 5 to 15; and g is 0.5 to 116, or 1 to 3.

In an embodiment, the procatalyst precursor is a benzoate-containing magnesium chloride material. As used herein, a "benzoate-containing magnesium chloride" ("BenMag") is a magnesium chloride procatalyst (i.e., a halogenated procatalyst precursor) containing a benzoate internal electron donor. The BenMag material may also include a titanium moiety, such as a titanium halide. The benzoate internal donor is labile and can be replaced by other electron donors during procatalyst synthesis. Nonlimiting examples of suitable benzoate groups include ethyl benzoate, methyl benzoate, ethyl p-methoxybenzoate, methyl p-ethoxybenzoate, ethyl p-ethoxybenzoate, ethyl p-chlorobenzoate. In one embodiment, the benzoate group is ethyl benzoate. Nonlimiting examples of suitable BenMag procatalyst precursors include catalysts of the trade names SHAC™ 103 and SHAC™ 310 available from The Dow Chemical Company, Midland, Mich.

In an embodiment, the BenMag procatalyst precursor is a product of halogenation of any procatalyst precursor (i.e., a MagMo precursor or a MagTi precursor) in the presence of a benzoate compound with the structure (I)

(I)

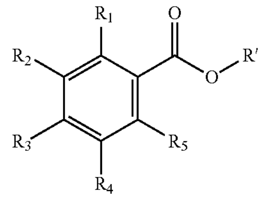

wherein $R_1$-$R_5$ are H, $C_1$-$C_{20}$ hydrocarbyl which may contain heteroatoms including F, Cl, Br, I, O, S, N, P, and Si, and R' is a $C_1$-$C_{20}$ hydrocarbyl group which may optionally contain heteroatom(s) including F, Cl, Br, I, O, S, N, P, and Si. Preferably, $R_1$-$R_5$ are selected from H and $C_1$-$C_{20}$ alkyl and R' is selected from $C_1$-$C_{20}$ alkyl and alkoxyalkyl.

Halogenation/titanation of the procatalyst precursor in the presence of the internal electron donor produces a procatalyst composition which includes a combination of a magnesium moiety, a titanium moiety, and the internal electron donor (a substituted phenylene aromatic diester). In an embodiment, the magnesium and titanium moieties are respective halides, such as magnesium chloride and titanium chloride. Bounded by no particular theory, it is believed that the magnesium halide is a support upon which the titanium halide is deposited and into which the internal electron donor is incorporated.

The resulting procatalyst composition has a titanium content of from about 1.0 percent by weight to about 6.0 percent by weight, based on the total weight of the procatalyst composition, or from about 1.0 percent by weight to about 5.5 percent by weight, or from about 2.0 percent by weight to about 5.0 percent by weight. The weight ratio of titanium to magnesium in the solid procatalyst composition is suitably between about 1:3 and about 1:160, or between about 1:4 and about 1:50, or between about 1:6 and 130. The internal electron donor is present in an amount from about 0.1 wt % to about 20.0 wt %, or from about 1.0 wt % to about 15 wt %. The substituted phenylene aromatic diester is present in the procatalyst composition in a molar ratio of internal electron donor to magnesium of from about 0.005:1 to about 1:1, or from about 0.01:1 to about 0.4:1. Weight percent is based on the total weight of the procatalyst composition.

Ethoxide content in the procatalyst composition indicates the completeness of conversion of precursor metal ethoxide into a metal halide. The substituted phenylene aromatic diester assists in converting ethoxide into halide during halogenation. In an embodiment, the procatalyst composition includes from about 0.01 wt % to about 1.0 wt %, or from about 0.05 wt % to about 0.5 wt % ethoxide. Weight percent is based on the total weight of the procatalyst composition.

In an embodiment, the internal electron donor is a mixed internal electron donor. As used herein, a "mixed internal electron donor" is (i) a substituted phenylene aromatic diester, (ii) an electron donor component that donates a pair of electrons to one or more metals present in the resultant procatalyst composition, and (iii) optionally other components. In an embodiment, the electron donor component is a benzoate, such as ethyl benzoate and/or methoxypropan-2-yl benzoate. The procatalyst composition with the mixed internal electron donor can be produced by way of the procatalyst production procedure as previously disclosed.

The internal electron donor includes the substituted phenylene aromatic diester and optionally an electron donor component. The substituted phenylene aromatic diester may be a substituted 1,2-phenylene aromatic diester, a substituted 1,3 phenylene aromatic diester, or a substituted 1,4 phenylene aromatic diester. In an embodiment, the internal electron donor is a 1,2-phenylene aromatic diester with the structure (II) below:

(II)

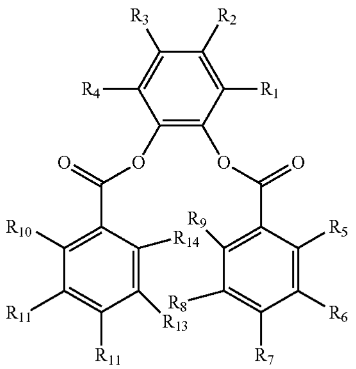

wherein $R_1$-$R_{14}$ are the same or different. Each of $R_1$-$R_{14}$ is selected from a hydrogen, substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. At least one of $R_1$-$R_{14}$ is not hydrogen.

As used herein, the term "hydrocarbyl" and "hydrocarbon" refer to substituents containing only hydrogen and carbon atoms, including branched or unbranched, saturated or unsaturated, cyclic, polycyclic, fused, or acyclic species, and combinations thereof. Nonlimiting examples of hydrocarbyl groups include alkyl-, cycloalkyl-, alkenyl-, alkadienyl-, cycloalkenyl-, cycloalkadienyl-, aryl-, aralkyl, alkylaryl, and alkynyl-groups.

As used herein, the terms "substituted hydrocarbyl" and "substituted hydrocarbon" refer to a hydrocarbyl group that is substituted with one or more nonhydrocarbyl substituent groups. A nonlimiting example of a nonhydrocarbyl substituent group is a heteroatom. As used herein, a "heteroatom" refers to an atom other than carbon or hydrogen. The heteroatom can be a non-carbon atom from Groups IV, V, VI, and VII of the Periodic Table. Nonlimiting examples of heteroatoms include: halogens (F Cl, Br, I), N, O, P, B, S, and Si. A substituted hydrocarbyl group also includes a halohydrocarbyl group and a silicon-containing hydrocarbyl group. As used herein, the term "halohydrocarbyl" group refers to a hydrocarbyl group that is substituted with one or more halogen atoms. As used herein, the term "silicon-containing hydrocarbyl group" is a hydrocarbyl group that is substituted with one or more silicon atoms. The silicon atom(s) may or may not be in the carbon chain.

In an embodiment, at least one (or two, or three, or four) R group(s) of $R_1$-$R_4$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. Each of $R_5$-$R_{14}$ is hydrogen.

In an embodiment, at least one (or some, or all) R group(s) of $R_5$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. In another embodiment, at least one of $R_5$-$R_9$ and at least one of $R_{10}$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof.

In an embodiment, at least one of $R_1$-$R_4$ and at least one of $R_5$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. In another embodiment, at least one of $R_1$-$R_4$ at least one $R_5$-$R_9$ of and at least one of $R_{10}$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof.

In an embodiment, any consecutive R groups in $R_1$-$R_4$, and/or any consecutive R groups in $R_5$-$R_9$, and/or any consecutive R groups in $R_{10}$-$R_{14}$ may be linked to form an inter-cyclic or an intra-cyclic structure. The inter-/intra-cyclic structure may or may not be aromatic. In an embodiment, the inter-/intra-cyclic structure is a $C_5$ or a $C_6$ membered ring.

In an embodiment, at least one of $R_1$-$R_4$ is selected from a substituted hydrocarbyl group having 1 to 20 carbon atoms, an unsubstituted hydrocarbyl group having 1 to 20 carbon atoms, and combinations thereof. Optionally, at least one of $R_5$-$R_{14}$ may be a halogen atom or an alkoxy group having 1 to 20 carbon atoms. Optionally, $R_1$-$R_4$, and/or $R_5$-$R_9$, and/or $R_{10}$-$R_{14}$ may be linked to form an inter-cyclic structure or an intra-cyclic structure. The inter-cyclic structure and/or the intra-cyclic structure may or may not be aromatic.

In an embodiment, any consecutive R groups in $R_1$-$R_4$, and/or in $R_5$-$R_9$, and/or in $R_{10}$-$R_{14}$, may be members of a $C_5$-$C_6$-membered ring.

In an embodiment, structure (II) includes $R_1$, $R_3$ and $R_4$ as hydrogen. $R_2$ is selected from a substituted hydrocarbyl group having 1 to 20 carbon atoms, an unsubstituted hydrocarbyl group having 1 to 20 carbon atoms, and combinations thereof. $R_5$-$R_{14}$ are the same or different and each of $R_5$-$R_{14}$ is selected from hydrogen, a substituted hydrocarbyl group having 1 to 20 carbon atoms, an unsubstituted hydrocarbyl group having 1 to 20 carbon atoms, an alkoxy group having 1 to 20 carbon atoms, a halogen, and combinations thereof.

In an embodiment, structure (II) includes $R_2$ that is methyl, and each of $R_5$-$R_{14}$ is hydrogen.

In an embodiment, structure (II) includes $R_2$ that is ethyl, and each of $R_5$-$R_{14}$ is hydrogen.

In an embodiment, structure (II) includes $R_2$ that is t-butyl, and each of $R_5$-$R_{14}$ is hydrogen.

In an embodiment, structure (II) includes $R_2$ that is ethoxycarbonyl, and each of $R_5$-$R_{14}$ is hydrogen.

In an embodiment, structure (II) includes $R_2$, $R_3$ and $R_4$ each as hydrogen and $R_1$ is selected from a substituted hydrocarbyl group having 1 to 20 carbon atoms, an unsubstituted hydrocarbyl group having 1 to 20 carbon atoms, and combinations thereof. $R_5$-$R_{14}$ are the same or different and each is selected from hydrogen, a substituted hydrocarbyl group having 1 to 20 carbon atoms, an unsubstituted hydrocarbyl group having 1 to 20 carbon atoms, an alkoxy group having 1 to 20 carbon atoms, a halogen, and combinations thereof.

In an embodiment, structure (II) includes $R_1$ that is methyl, and each of $R_5$-$R_{14}$ is hydrogen.

In an embodiment, structure (II) includes $R_2$ and $R_4$ that are hydrogen and $R_1$ and $R_3$ are the same or different. Each of $R_1$ and $R_3$ is selected from a substituted hydrocarbyl group having 1 to 20 carbon atoms, an unsubstituted hydrocarbyl group having 1 to 20 carbon atoms, and combinations thereof. $R_5$-$R_{14}$ are the same or different and each of $R_5$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a halogen, and combinations thereof.

In an embodiment, structure (II) includes $R_1$ and $R_3$ that are the same or different. Each of $R_1$ and $R_3$ is selected from a $C_1$-$C_8$ alkyl group, a $C_3$-$C_6$ cycloalkyl group, or a substituted $C_3$-$C_6$ cycloalkyl group. $R_5$-$R_{14}$ are the same or different and each of $R_5$-$R_{14}$ is selected from hydrogen, a $C_1$-$C_8$ alkyl group, and a halogen. Nonlimiting examples of suitable $C_1$-$C_8$ alkyl groups include methyl, ethyl, n-propyl, isopropyl, n-butyl, i-butyl, t-butyl, n-pentyl, i-pentyl, neopentyl, t-pentyl, n-hexyl, and 2,4,4-trimethylpentan-2-yl group. Nonlimiting examples of suitable $C_3$-$C_6$ cycloalkyl groups include cyclopentyl and cyclohexyl groups. In a further embodiment, at least one of $R_5$-$R_{14}$ is a $C_1$-$C_6$ alkyl group or a halogen.

In an embodiment, structure (II) includes $R_1$ that is a methyl group and $R_3$ that is a t-butyl group. Each of $R_2$, $R_4$ and $R_5$-$R_{14}$ is hydrogen.

In an embodiment, structure (II) includes $R_1$ and $R_3$ that is an isopropyl group. Each of $R_2$, $R_4$ and $R_5$-$R_{14}$ is hydrogen.

In an embodiment, structure (II) includes each of $R_1$, $R_5$, and $R_{10}$ as a methyl group and $R_3$ is a t-butyl group. Each of $R_2$, $R_4$, $R_6$-$R_9$ and $R_{11}$-$R_{14}$ is hydrogen.

In an embodiment, structure (II) includes each of $R_1$, $R_7$, and $R_{12}$ as a methyl group and $R_3$ is a t-butyl group. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (II) includes $R_1$ as a methyl group and $R_3$ is a t-butyl group. Each of $R_7$ and $R_{12}$ is an ethyl group. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (II) includes each of $R_1$, $R_5$, $R_7$, $R_9$, $R_{10}$, $R_{12}$, and $R_{14}$ as a methyl group and $R_3$ is a t-butyl group. Each of $R_2$, $R_4$, $R_6$, $R_8$, $R_{11}$, and $R_{13}$ is hydrogen.

In an embodiment, structure (II) includes $R_1$ as a methyl group and $R_3$ is a t-butyl group. Each of $R_5$, $R_7$, $R_9$, $R_{10}$, $R_{12}$, and $R_{14}$ is an i-propyl group. Each of $R_2$, $R_4$, $R_6$, $R_8$, $R_{11}$, and $R_{13}$ is hydrogen.

In an embodiment, the substituted phenylene aromatic diester has a structure (III) which includes $R_1$ that is a methyl group and $R_3$ is a t-butyl group. Each of $R_2$ and $R_4$ is hydrogen. $R_8$ and $R_9$ are members of a $C_6$ membered ring to form a 1-naphthoyl moiety. $R_{13}$ and $R_{14}$ are members of a $C_6$ membered ring to form another 1-naphthoyl moiety. Structure (III) is provided below.

(III)

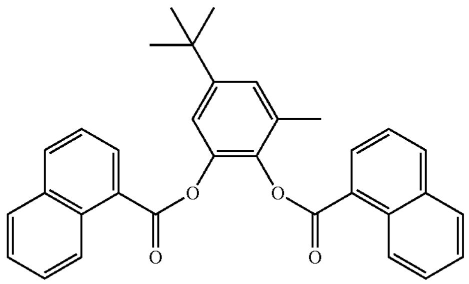

In an embodiment, the substituted phenylene aromatic diester has a structure (IV) which includes $R_1$ that is a methyl group and $R_3$ is a t-butyl group. Each of $R_2$ and $R_4$ is hydrogen. $R_6$ and $R_7$ are members of a $C_6$ membered ring to form a 2-naphthoyl moiety. $R_{12}$ and $R_{13}$ are members of a $C_6$ membered ring to form a 2-naphthoyl moiety. Structure (IV) is provided below.

(IV)

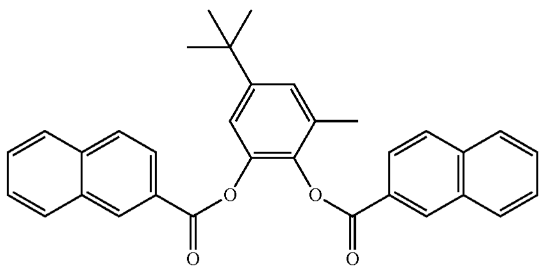

In an embodiment, structure (II) includes $R_1$ that is a methyl group and $R_3$ is a t-butyl group. Each of $R_7$ and $R_{12}$ is an ethoxy group. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (II) includes $R_1$ that is a methyl group and $R_3$ is a t-butyl group. Each of $R_7$ and $R_{12}$ is a fluorine atom. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (II) includes $R_1$ that is a methyl group and $R_3$ is a t-butyl group. Each of $R_7$ and $R_{12}$ is a chlorine atom. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (II) includes $R_1$ that is a methyl group and $R_3$ is a t-butyl group. Each of $R_7$ and $R_{12}$ is a bromine atom. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (II) includes $R_1$ that is a methyl group and $R_3$ is a t-butyl group. Each of $R_7$ and $R_{12}$ is an iodine atom. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (II) includes $R_1$ that is a methyl group and $R_3$ is a t-butyl group. Each of $R_6$, $R_7$, $R_{11}$, and $R_{12}$ is a chlorine atom. Each of $R_2$, $R_4$, $R_5$, $R_8$, $R_9$, $R_{10}$, $R_{13}$, and $R_{14}$ is hydrogen.

In an embodiment, structure (II) includes $R_1$ that is a methyl group and $R_3$ is a t-butyl group. Each of $R_6$, $R_8$, $R_{11}$, and $R_{13}$ is a chlorine atom. Each of $R_2$, $R_4$, $R_5$, $R_7$, $R_9$, $R_{10}$, $R_{12}$, and $R_{14}$ is hydrogen.

In an embodiment, structure (II) include $R_1$ that is a methyl group and $R_3$ is a t-butyl group. Each of $R_2$, $R_4$ and $R_5$-$R_{14}$ is a fluorine atom.

In an embodiment, structure (II) includes $R_1$ that is a methyl group and $R_3$ is a t-butyl group. Each of $R_7$ and $R_{12}$ is a trifluoromethyl group. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (II) includes $R_1$ that is a methyl group and $R_3$ is a t-butyl group. Each of $R_7$ and $R_{12}$ is an ethoxycarbonyl group. Each of $R_2$, $R_4$, $R_5$, $R_6$, $R_8$, $R_9$, $R_{10}$, $R_{11}$, $R_{13}$, and $R_{14}$ is hydrogen.

In an embodiment, $R_1$ is methyl group and $R_3$ is a t-butyl group. Each of $R_7$ and $R_{12}$ is an ethoxy group. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (II) includes $R_1$ that is a methyl group and $R_3$ is a t-butyl group. Each of $R_7$ and $R_{12}$ is an diethylamino group. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (II) includes $R_1$ that is a methyl group and $R_3$ is a 2,4,4-trimethylpentan-2-yl group. Each of $R_2$, $R_4$ and $R_5$-$R_{14}$ is hydrogen.

In an embodiment, structure (II) includes $R_1$ and $R_3$, each of which is a sec-butyl group. Each of $R_2$, $R_4$ and $R_5$-$R_{14}$ is hydrogen.

In an embodiment, the substituted phenylene aromatic diester has a structure (V) whereby $R_1$ and $R_2$ are members of a $C_6$ membered ring to form a 1,2-naphthalene moiety. Each of $R_5$-$R_{14}$ is hydrogen, Structure (V) is provided below.

(V)

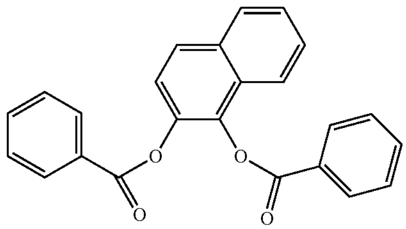

In an embodiment, the substituted phenylene aromatic diester has a structure (VI) whereby $R_2$ and $R_3$ are members of a $C_6$ membered ring to form a 2,3-naphthalene moiety. Each of $R_5$-$R_{14}$ is hydrogen. Structure (VI) is provided below.

(VI)

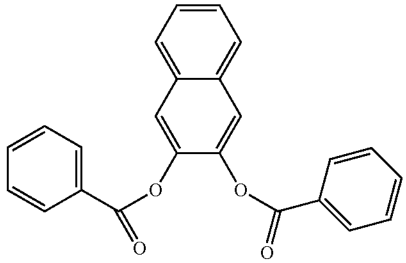

In an embodiment, structure (II) includes $R_1$ and $R_4$ that are each a methyl group. Each of $R_2$, $R_3$, $R_5$-$R_9$ and $R_{10}$-$R_{14}$ is hydrogen.

In an embodiment, structure (II) includes $R_1$ that is a methyl group. $R_4$ is an i-propyl group. Each of $R_2$, $R_3$, $R_5$-$R_9$ and $R_{10}$-$R_{14}$ is hydrogen.

In an embodiment, structure (II) includes $R_1$, $R_3$, and $R_4$, each of which is an i-propyl group. Each of $R_2$, $R_5$-$R_9$ and $R_{10}$-$R_{14}$ is hydrogen.

Nonlimiting examples of suitable SPAD for the internal electron donor are set forth in Table 1 below.

TABLE 1

| Compound | Structure | $^1H$ NMR (500 MHz, $CDCl_3$, ppm) |
|---|---|---|
| 3-methyl-5-tert-butyl-1,2-phenylene dibenzoate (IED2) | 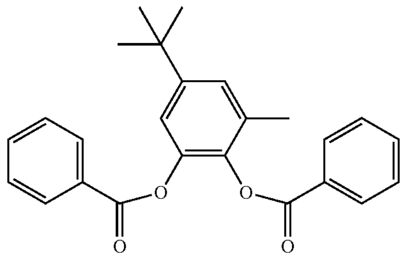 [SMILES: Cc1cc(C(C)(C)C)cc(OC(=O)c2ccccc2)c1OC(=O)c1ccccc1] | δ 8.08 (dd, 2H), 8.03 (dd, 2H), 7.53 (tt, 1H), 7.50 (tt, 1H), 7.38 (t, 2H), 7.34 (t, 2H), 7.21 (d, 1H), 7.19 (d, 1H), 2.28 (s, 3H), 1.34 (s, 9H). |

TABLE 1-continued
| Compound | Structure | $^1$H NMR (500 MHz, $CDCl_3$, ppm) |
|---|---|---|
| 3,5-diisopropyl-1,2-phenylene dibenzoate (IED3) | 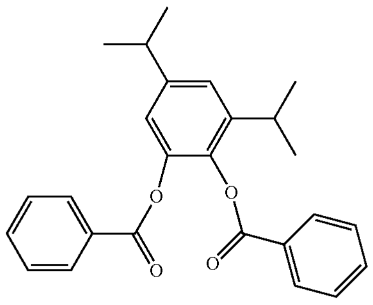 [SMILES: CC(C)c1cc(OC(=O)c2ccccc2)c(OC(=O)c2ccccc2)c(C(C)C)c1] | δ 8.08 (dd, 2H), 7.00 (dd, 2H), 7.53 (tt, 1H), 7.48 (tt, 1H), 7.39 (t, 2H), 7.31 (t, 2H), 7.11 (d, 1H), 7.09 (d, 1H), 3.11 (heptat, 1H), 2.96 (heptat, 1H), 1.30 (d, 6H), 1.26 (d, 6H). |
| 3,6-dimethyl-1,2-phenylene dibenzoate (IED4) | 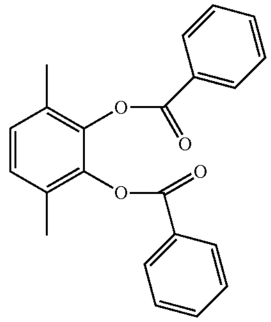 [SMILES: Cc1ccc(C)c(OC(=O)c2ccccc2)c1OC(=O)c1ccccc1] | δ 8.08 (d, 2H), 7.51 (t, 1H), 7.34 (d, 2H), 7.11 (s, 2H), 2.23 (s, 6H). |
| 4-t-butyl-1,2-phenylene dibenzoate (IED5) | 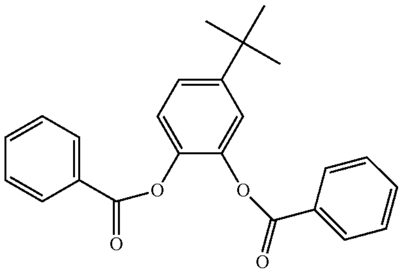 [SMILES: CC(C)(C)c1ccc(OC(=O)c2ccccc2)c(OC(=O)c2ccccc2)c1] | δ 8.07 (dd, 4H), 7.54 (m, 2H), 7.30-7.40 (m, 7H), 1.37 (s, 9H). |
| 4-methyl 1,2-phenylene dibenzoate (IED6) | 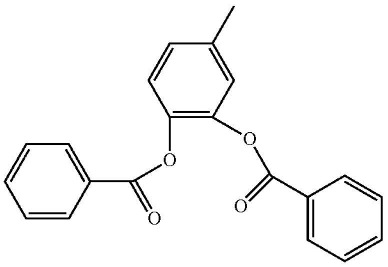 [SMILES: Cc1ccc(OC(=O)c2ccccc2)c(OC(=O)c2ccccc2)c1] | δ (ppm) 8.07 (d, 4H), 7.54 (t, 2H), 7.37 (t, 4H), 7.27 (d, 1H), 7.21 (s, 1H), 7.15 (d, 1H), 2.42 (s, 3H). |
| 1,2-naphthalene dibenzoate (IED7) | 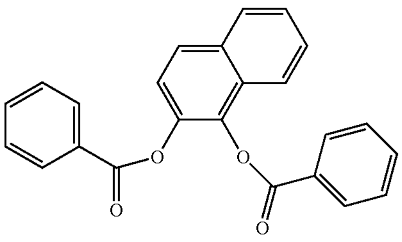 [SMILES: O=C(Oc1ccc2ccccc2c1OC(=O)c1ccccc1)c1ccccc1] | δ 8.21-8.24 (m, 2H), 8.08-8.12 (m, 2H), 7.90-7.96 (m, 2H), 7.86 (d, 1H), 7.60 (m, 1H), 7.50-7.55 (m, 4H), 7.46 (t, 2H), 7.37 (t, 2H). |

TABLE 1-continued

| Compound | Structure | $^1$H NMR (500 MHz, $CDCl_3$, ppm) |
|---|---|---|
| 2,3-naphthalene dibenzoate (IED8) | 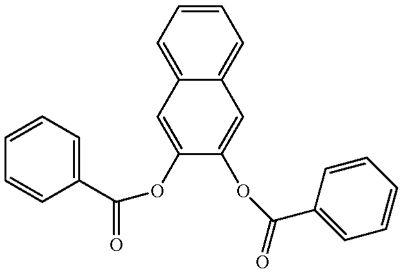 [SMILES: O=C(Oc1cc2ccccc2cc1OC(=O)c1ccccc1)c1ccccc1] | δ 8.08-8.12 (m, 4H), 7.86-7.90 (m, 4H), 7.51-7.58 (m, 4H), 7.38 (t, 4H) |
| 3-methyl-5-tert-butyl-1,2-phenylene di(4-methylbenzoate) (IED9) | 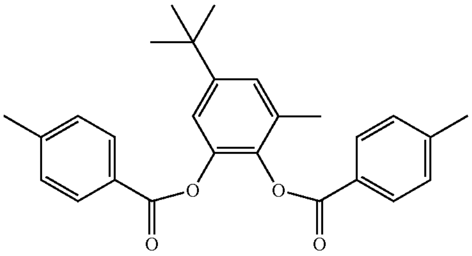 | δ (ppm) 7.98 (d, 2H), 7.93 (d, 2H), 7.18 (d, 4H), 7.15 (d, 2H), 2.38 (s, 3H), 2.36 (s, 3H), 2.26 (s, 3H), 1.35 (s, 9H). |
| 3-methyl-5-tert-butyl-1,2-phenylene di(2,4,6-trimethylbenzoate) (IED10) | 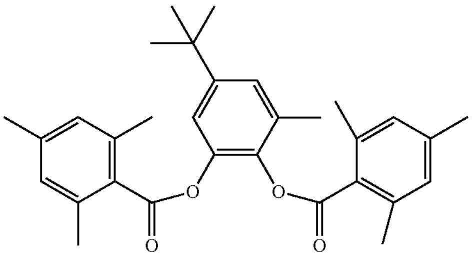 | δ (ppm) 7.25 (s, 1H), 7.21 (s, 1H), 6.81 (d, 4H), 2.36 (s, 3H), 2.30 (d, 6H), 2.25 (s, 6H), 2.23 (s, 6H), 1.36 (s, 9H). |
| 3-methyl-5-test-butyl-1,2-phenylene di(4-fluorobenzoate) (IED11) | 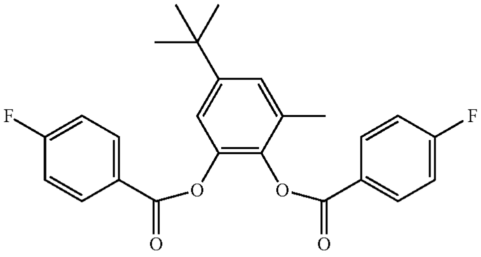 [SMILES: Cc1cc(C(C)(C)C)cc(OC(=O)c2ccc(F)cc2)c1OC(=O)c1ccc(F)cc1] | δ 7.98 (dd, 4H), 7.36 (dd, 4H), 7.21 (s, 1H), 7.17 (s, 1H), 2.26 (s, 3H), 1.34 (s, 9H). |
| 3-methyl-5-tert-butyl-1,2-phenylene di(4-chlorobenzoate) (IED12) | 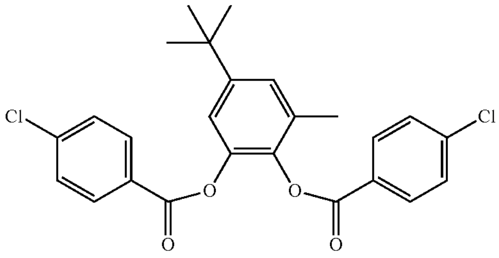 [SMILES: Cc1cc(C(C)(C)C)cc(OC(=O)c2ccc(Cl)cc2)c1OC(=O)c1ccc(Cl)cc1] | δ 7.98 (dd, 4H), 7.36 (dd, 4H), 7.21 (s, 1H), 7.17 (s, 1H), 2.26 (s, 3H), 1.34 (s, 9H). |

* comparative

In an embodiment, the substituted phenylene aromatic diester is 5-t-butyl-3-methyl-1,2-phenylene dibenzoate.

In an embodiment, the catalyst composition includes a cocatalyst. As used herein, a "cocatalyst" is a substance capable of converting the procatalyst to an active polymerization catalyst. The cocatalyst may include hydrides, alkyls, or aryls of aluminum, lithium, zinc, tin, cadmium, beryllium, magnesium, and combinations thereof. In an embodiment, the cocatalyst is a hydrocarbyl aluminum compound represented by the formula $R_nAlX_{3-n}$ wherein n=1 2, or 3, R is an alkyl, and X is a halide or alkoxide. Nonlimiting examples of suitable cocatalyst include from trimethylaluminum, triethylaluminum, triisobutylaluminum, and tri-n-hexylaluminum.

In an embodiment, the cocatalyst is triethylaluminum. The molar ratio of aluminum to titanium is from about 5:1 to about 500:1, or from about 10:1 to about 200:1, or from about 15:1 to about 150:1, or from about 20:1 to about 100:1, or from about 30:1 to about 60:1. In another embodiment, the molar ratio of aluminum to titanium is about 35:1.

In an embodiment, the present catalyst composition includes an external electron donor. As used herein, an "external electron donor" (or "EED") is a compound added independent of procatalyst formation and includes at least one functional group that is capable of donating a pair of electrons to a metal atom. A "mixed external electron donor" (or "MEED") is a mixture of two or more external electron donors. Bounded by no particular theory, it is believed that provision of one or more external electron donors in the catalyst composition affects the following properties of the formant polymer: level of tacticity (i.e., xylene soluble material), molecular weight (i.e., melt flow), molecular weight distributor (MWD), melting point, and/or oligomer level.

In an embodiment, the external electron donor may be selected from one or more of the following: a silicon compound, a bidentate compound, an amine, an ether, a carboxylate, a ketone, an amide, a carbamate, a phosphine, a phosphate, a phosphite, a sulfonate, a sulfone, a sulfoxide, and any combination of the foregoing.

In an embodiment, the EED is a silicon compound having the general formula (VII):

$$SiR_m(OR')_{4-m} \quad (VII)$$

wherein R independently each occurrence is hydrogen or a hydrocarbyl or an amino group, optionally substituted with one or more substituents containing one or more Group 14, 15, 16, or 17 heteroatoms. R contains up to 20 atoms not counting hydrogen and halogen. R' is a $C_{1-20}$ alkyl group, and m is 0, 1, or 2. In an embodiment, R is $C_{6-12}$ aryl, alkylaryl or aralkyl, $C_{3-12}$ cycloallyl, $C_{1-20}$ linear alkyl or alkenyl, $C_{3-12}$ branched alkyl, or $C_{3-12}$ cyclic amino group, R' is $C_{1-4}$ alkyl, and m is 1 or 2.

Nonlimiting examples of suitable silicon compounds for the EED include dialkoxysilanes, trialkoxysilanes, and tetraalkoxysilanes such as dicyclopentyldimethoxysilane, diisopropyldimethoxysilane, bis(perhydroisoquinolino)dimethoxysilane, methylcyclohexyldimethoxysilane, tetraethoxysilane, n-propyltrimethoxysilane, n-propyltriethoxysilane, diethylaminotriethoxysilane, bis(trimethylsilylmethyl)dimethoxysilane, and any combination thereof.

In an embodiment, the catalyst composition includes an activity limiting agent (ALA). As used herein, an "activity limiting agent" ("ALA") is a material that reduces catalyst activity at elevated temperature (i.e., temperature greater than about 85° C.). An ALA inhibits or otherwise prevents polymerization reactor upset and ensures continuity of the polymerization process. Typically, the activity of Ziegler-Natta catalysts increases as the reactor temperature rises. Ziegler-Natta catalysts also typically maintain high activity near the softening point temperature of the polymer produced. The heat generated by the exothermic polymerization reaction may cause polymer particles to form agglomerates and may ultimately lead to disruption of continuity for the polymer production process. The ALA reduces catalyst activity at elevated temperature, thereby preventing reactor upset, reducing (or preventing) particle agglomeration, and ensuring continuity of the polymerization process.

The ALA may or may not be a component of the EED and/or the MEED. The activity limiting agent may be a carboxylic acid ester, a diether, a poly(alkene glycol), a succinate, a diol ester, and combinations thereof. The carboxylic acid ester can be an aliphatic or aromatic, mono- or poly-carboxylic acid ester. Nonlimiting examples of suitable carboxylic acid esters include benzoates, $C_{1-40}$ alkyl esters of aliphatic $C_{2-40}$ mono-/di-carboxylic acids, $C_{2-40}$ mono-/poly-carboxylate derivatives of $C_{2-100}$ (poly)glycols, $C_{2-100}$ (poly)glycol ethers, and any combination thereof. Further nonlimiting examples of carboxylic acid esters include laurates, myristates, palmitates, stearates, oleates, sebacates, and (poly)(alkylene)glycols, and mixtures thereof. In a further embodiment, the ALA is isopropyl myristate or di-n-butyl sebacate.

The catalyst composition may include any of the foregoing external electron donors in combination with any of the foregoing activity limiting agents. The external electron donor and/or activity limiting agent can be added into the reactor separately. Alternatively, the external electron donor and the activity limiting agent can be mixed together in advance and then added to the catalyst composition and/or into the reactor as a mixture.

In an embodiment, the procatalyst composition is in solid, particulate form and is a Ziegler Natta procatalyst composition with an internal electron donor including a substituted phenylene aromatic diester. The Ziegler-Natta procatalyst composition is in solid, particulate form. The Ziegler Natta procatalyst particles have a D50 from 10 microns to 15 microns. The term "D50," as used herein, is the median particle diameter such that 50% of the sample weight is above the stated particle diameter. In a further embodiment, the substituted phenylene aromatic diester is 5-t-butyl-3-methyl-1,2-phenylene dibenzoate.

In an embodiment, the procatalyst composition is in solid, particulate form and is a Ziegler Natta procatalyst composition with an internal electron donor including a substituted phenylene aromatic diester. The Ziegler-Natta procatalyst composition is in solid, particulate form. The Ziegler Natta procatalyst particles have a D50 from 25 microns to 30 microns. In a further embodiment, the substituted phenylene aromatic diester is 5-t-butyl-3-methyl-1,2-phenylene dibenzoate.

In an embodiment, the process includes injecting into the wet zone a Ziegler-Natta catalyst composition with an internal electron donor including 5-t-butyl-3-methyl-1,2-phenylene dibenzoate.

In an embodiment, the process includes injecting into the wet zone particles of a Ziegler Natta procatalyst composition with an internal electron donor including a substituted phenylene aromatic diester. The procatalyst particles have a D50 from 10 microns to 15 microns. In a further embodiment, the Ziegler-Natta procatalyst particles have a D50 of 12 microns. In an embodiment, the substituted phenylene aromatic diester is 5-t-butyl-3-methyl-1,2-phenylene dibenzoate.

In an embodiment, the process includes injecting into the wet zone particles of a Ziegler-Natta procatalyst composition with an internal electron donor including a substituted phenylene aromatic diester. The Ziegler-Natta procatalyst particles have a D50 from 25 microns to 30 microns. In a further embodiment, the Ziegler-Natta procatalyst particles have a D50 of 27 microns. In an embodiment, the substituted phenylene aromatic diester is 5-t-butyl-3-methyl-1,2-phenylene dibenzoate.

In an embodiment, the process includes injecting, at the injection point, (i) a catalyst composition comprising a procatalyst composition comprising a substituted phenylene aromatic diester, (ii) a cocatalyst, and (iii) an external electron donor.

DEFINITIONS

All references to the Periodic Table of the Elements herein shall refer to the Periodic Table of the Elements, published and copyrighted by CRC Press, Inc., 2003. Also, any references to a Group or Groups shall be to the Groups or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference), especially with respect to the disclosure of synthetic techniques, definitions (to the extent not inconsistent with any definitions provided herein) and general knowledge in the art.

The numerical figures and ranges here are approximate, and thus may include values outside of the range unless otherwise indicated. Numerical ranges (e.g., as "X to Y", or "X or more" or "Y or less") include all values from and including the lower and the upper values, in increments of one unit, provided that there is a separation of at least two units between any lower value and any higher value. As an example, if a compositional, physical or other property, such as, for example, temperature, is from 100 to 1,000, then all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. For ranges containing explicit values (e.g., 1 or 2, or 3 to 5, or 6, or 7) any subrange between any two explicit values is included (e.g., 1 to 2; 2 to 6; 5 to 7; 3 to 7; 5 to 6; etc.).

The term "comprising," and derivatives thereof, is not intended to exclude the presence of any additional component, step or procedure, whether or not the same is disclosed herein. In order to avoid any doubt, all compositions claimed herein through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition," as used herein, includes a mixture of materials which comprise the composition, as well as reaction products and decomposition products formed from the materials of the composition.

The term "polymer" is a macromolecular compound prepared by polymerizing monomers of the same or different type. "Polymer" includes homopolymers, copolymers, terpolymers, interpolymers, and so on. The term "interpolymer" means a polymer prepared by the polymerization of at least two types of monomers or comonomers. It includes, but is not limited to, copolymers (which usually refers to polymers prepared from two different types of monomers or comonomers, terpolymers (which usually refers to polymers prepared from three different types of monomers or comonomers), tetrapolymers (which usually refers to polymers prepared from four different types of monomers or comonomers), and the like.

The term "interpolymer," as used herein, refers to polymers prepared by the polymerization of at least two different types of monomers. The generic term interpolymer thus includes copolymers, usually employed to refer to polymers prepared from two different monomers, and polymers prepared from more than two different types of monomers.

The term, "ethylene-containing polymer," as used herein, refers to a polymer that comprises at least 0.1 weight percent polymerized ethylene monomer (based on the total weight of polymerizable monomers), and optionally may comprise at least one polymerized comonomer.

The term, "propylene-based polymer," as used herein, refers to a polymer that comprises a majority weight percent polymerized propylene monomer (based on the total amount of polymerizable monomers), and optionally may comprise at least one polymerized comonomer.

"Productivity" is the weight of polymer produced per weight of catalyst used in the polymerization process (i.e., grams polymer/gram catalyst).

By way of example and not limitation, examples of the present disclosure will now be given.

EXAMPLES

Gas-phase polymerization of olefin monomers is performed in a Unipol reactor. The catalyst composition is a HAC catalyst composition that is a ZN-SPAD procatalyst composition with an internal electron donor that is 5-tert-butyl-3-methyl-1,2-phenylene dibenzoate. Triethyl aluminum is the cocatalyst. The external electron donor is an SCA/ALA, the components of which are listed in Table 2. The preparation for the ZN-SPAD procatalyst composition is provided below.

Procatalyst Composition

At ambient temperature, 351 g of a mixed magnesium/titanium halide alcoholate is agitated in a mixture of 1.69 kg of chlorobenzene and 4.88 kg of titanium(IV) chloride. After 10 minutes, 750 mL of a chlorobenzene solution containing 164.5 g of 5-tert-butyl-3-methyl-1,2-phenylene dibenzoate is added, followed by an additional 0.46 kg of chlorobenzene. The mixture is agitated at 100° C. for 60 minutes, allowed to settle, then filtered at 100° C. The solids are agitated in 3.16 kg of chlorobenzene at 70° C. for 15 minutes, allowed to settle, then filtered at 70° C. The solids are agitated in a mixture of 2.36 kg of chlorobenzene and 4.84 kg of titanium(IV) chloride, and after 10 minutes, a solution of 109.7 g of 5-tert-butyl-3-methyl-1,2-phenylene dibenzoate in 416 g of chlorobenzene is added, followed by an additional 0.20 kg of chlorobenzene. The mixture is agitated at 105-110° C. for 30 minutes, allowed to settle, then filtered at 105-110° C. The solids are agitated in a mixture of 3.10 kg of chlorobenzene and 4.84 kg of titanium (IV) chloride at 105-110° C. for 30 minutes, allowed to settle, then filtered at 105-110° C. After cooling, the solids are washed twice with 3.47 kg of hexane at 45° C., followed by a final wash with 3.47 kg of 2-methylbutane at ambient temperature. The solids are subjected to vacuum to remove residual volatiles, and then combined with 683 g of mineral to generate a slurry.

Figure 2:
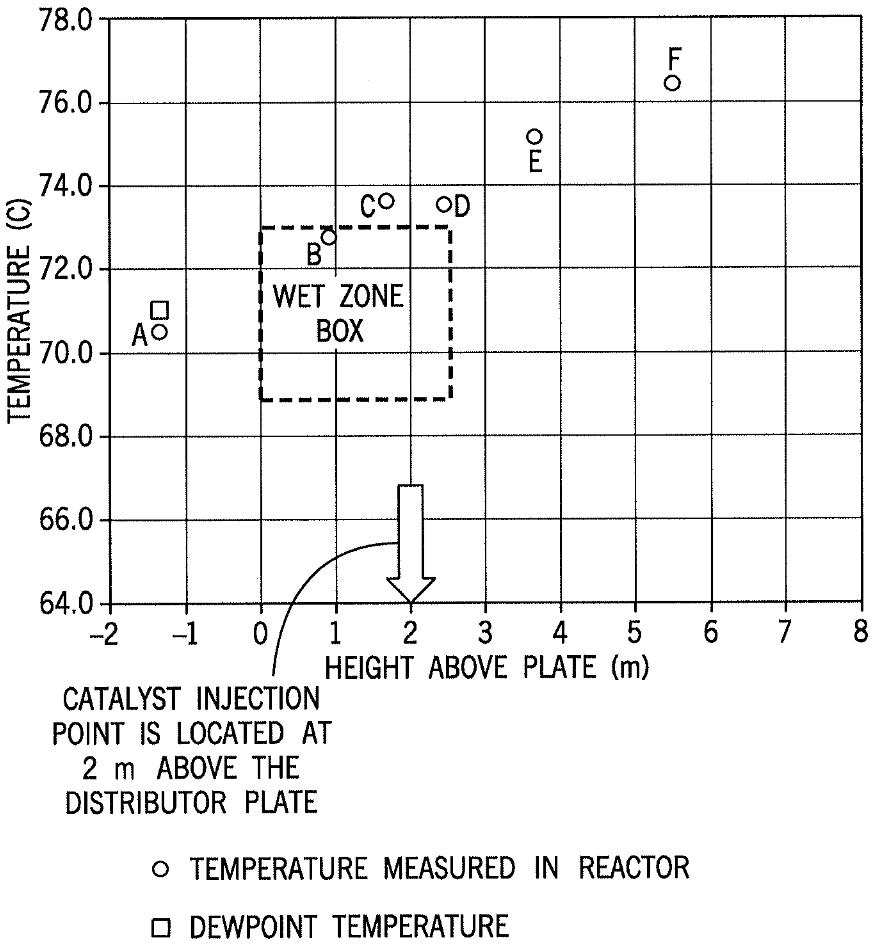
FIG. 2 is a reactor-temperature profile for a gas-phase polymerization run for propylene homopolymer production.

FIG. 2 is the reactor temperature profile for comparative sample 1.

Figure 3:
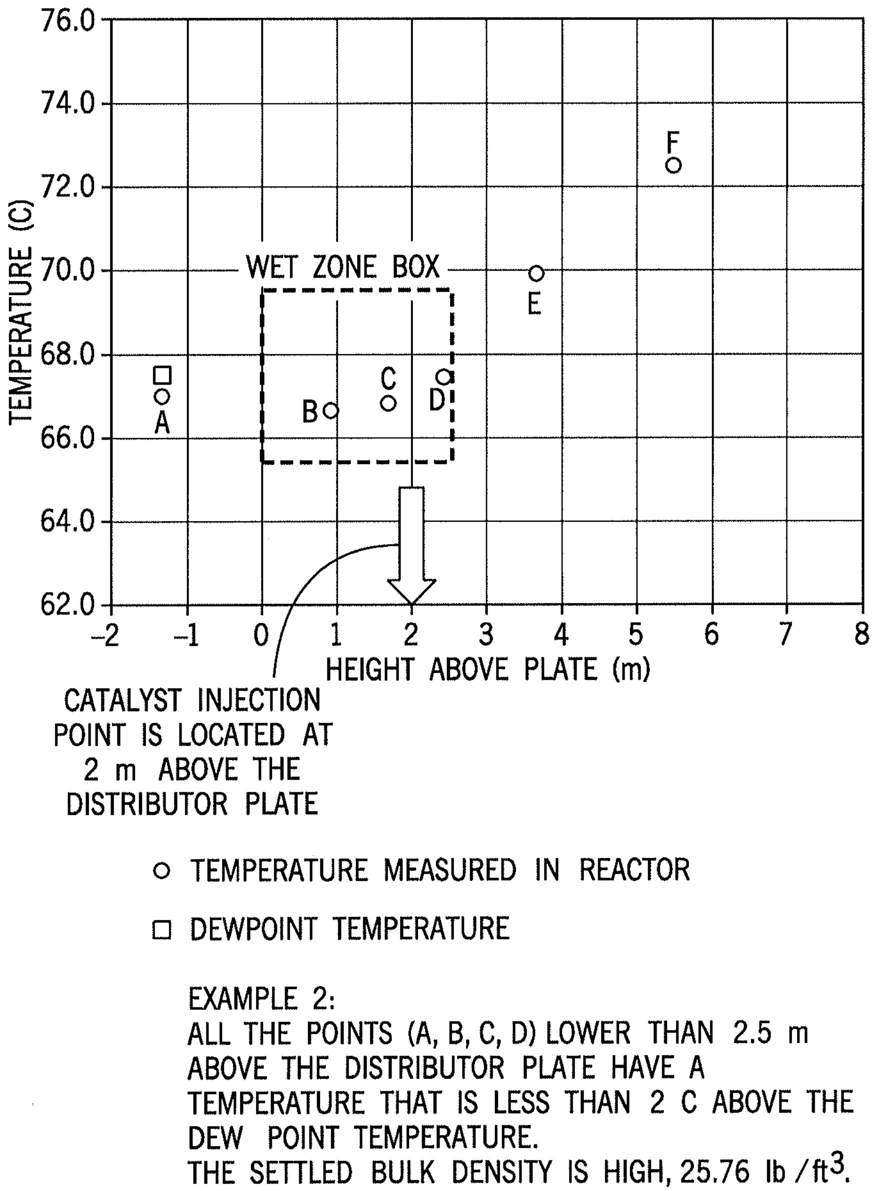
FIG. 3 is a reactor-temperature profile for a gas-phase polymerization run for propylene homopolymer production utilizing a wet zone in accordance with an embodiment of the present disclosure.

FIG. 3 is the reactor-temperature profile for example 2.

Figure 4:
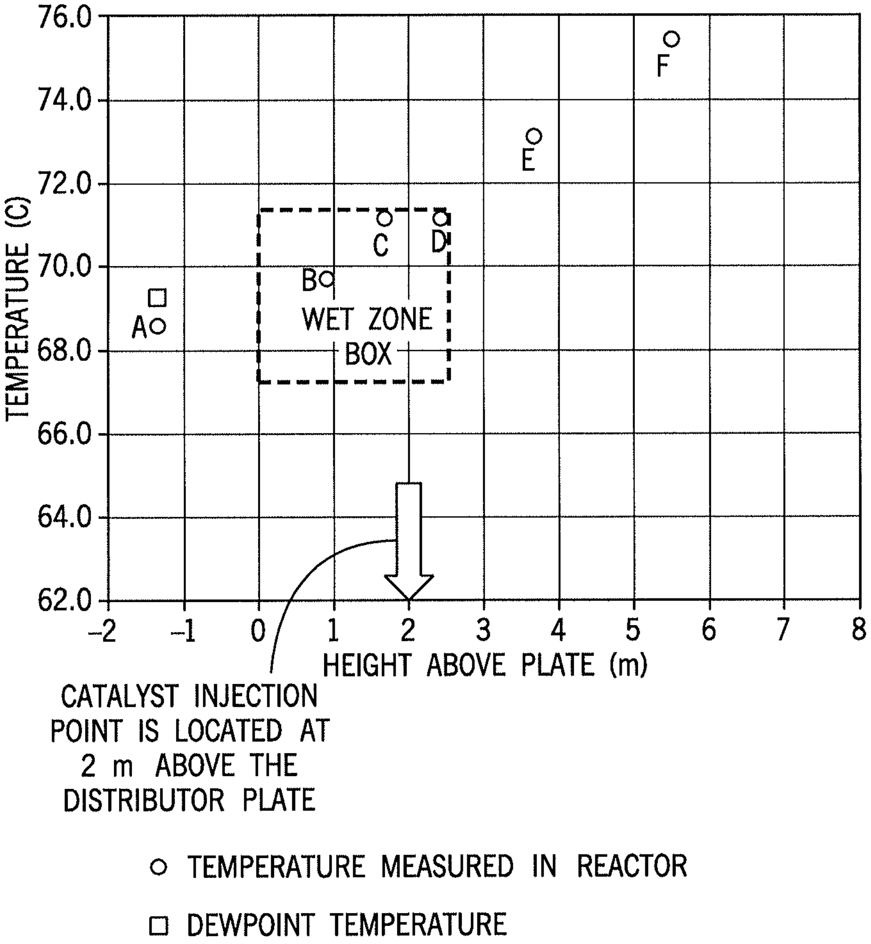
FIG. 4 is a reactor-temperature profile for a gas-phase polymerization run for propylene homopolymer production utilizing a wet zone in accordance with an embodiment of the present disclosure.

FIG. 4 is the reactor-temperature profile for example 3.

Figure 5:
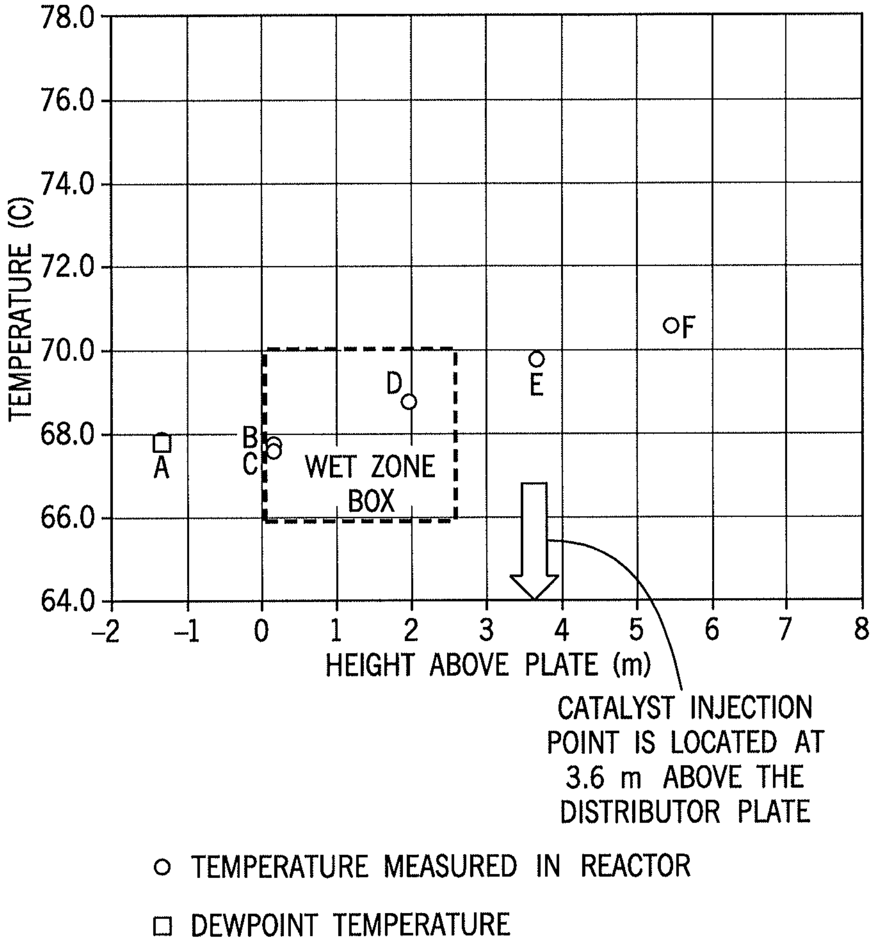
FIG. 5 is a reactor-temperature profile for a gas-phase polymerization run for propylene homopolymer production.

FIG. 5 is the reactor-temperature profile for comparative sample 4.

TABLE 2

| Reactor Condition | 1 Comparative Sample | 2 Example | 3 Example | 4 Comparative Sample |
|---|---|---|---|---|
| External Donor | N-donor/IPM | N-donor/IPM | N-donor/IPM | D-donor/IPM |
| Catalyst productivity (ton/kg) | 53.9 | 68.1 | 54.1 | 61.9 |
| Reactor pressure (kg/cm2) | 34.9 | 32.6 | 34.9 | 34.0 |
| Propylene partial pressure (kg/cm$^2$) | 27.3 | 26.8 | 27.5 | 29.3 |
| Propane partial pressure (kg/cm$^2$) | 5.3 | 3.8 | 4.5 | 2.1 |
| Hydrogen partial pressure (kg/cm$^2$) | 0.9 | 0.3 | 0.9 | 1.1 |
| Nitrogen partial pressure (kg/cm$^2$) | 1.4 | 1.8 | 2.0 | 1.6 |
| Catalyst injection point (distance above distributor plate (m) | 2.0 | 2.0 | 2.0 | 3.6 |
| Reactor Temperature Set Point (C.) | 74.9 | 70.1 | 73.2 | 70.3 |
| Dew Point temp (C.) | 71.0 | 67.5 | 69.3 | 67.8 |
| Height of Point A | −1.4 | −1.4 | −1.4 | −1.3 |
| Height of Point B | 0.9 | 0.9 | 0.9 | 0.2 |
| Height of Point C | 1.7 | 1.7 | 1.7 | 0.2 |
| Height of Point D | 2.4 | 2.4 | 2.4 | 2.0 |
| Height of Point E | 3.7 | 3.7 | 3.7 | 3.6 |
| Height of Point F | 5.49 | 5.49 | 5.49 | 5.45 |
| Temperature at Point A (C.) | 70.5 | 67.0 | 68.6 | 67.9 |
| Temperature at Point B (C.) | 72.8 | 66.7 | 69.7 | 67.8 |
| Temperature at Point C (C.) | 73.6 | 66.8 | 71.2 | 67.6 |
| Temperature at Point D (C.) | 73.5 | 67.4 | 71.2 | 68.8 |
| Temperature at Point E (C.) | 75.2 | 69.9 | 73.1 | 69.8 |
| Temperature at Point F (C.) | 76.5 | 72.5 | 75.4 | 70.6 |
| Wet Zone Present | No | Yes | Yes | Yes |
| Catalyst Injection Point in Wet Zone | n/a | Yes | Yes | No |
| Production rate (ton/hr) | 24.6 | 21.0 | 25.1 | 17.3 |
| Condensed liquid in recycle stream (wt %) | 17.1 | 15.0 | 16.4 | 11.5 |
| Settled Bulk Density (SBD) (g/cc) | 0.37 | 0.41 | 0.41 | 0.32 |
| Settled Bulk Density (SBD) (lb/ft$^3$) | 23.36 | 25.76 | 25.78 | 20.10 |
| Average Particle Size (APS) (mm) | 0.50 | 0.55 | 0.47 | 0.51 |

D-donor—dicyclopentyldimethoxysilane (DCPDMS)
IPM—isopropyl myristate
N-donor—n-propyltrimethoxysilane (NPTMS)

Description of Examples

The reactor contains a fluidized bed of polypropylene powder, which is fluidized by means of a compressor and recycle gas stream. Reactor temperature control is achieved by cooling the recycle gas stream by means of an in-line heat exchanger. When the recycle gas is cooled below the Dew Point Temperature a part of the recycle stream condenses to liquid. After passing through the heat exchanger, the recycle stream including both gas and liquid phases passes through a distributor plate at the bottom of the fluidized bed reactor.

Catalyst, triethyl aluminum (TEAL) and a selectivity control agent (SCA) or donor are continuously fed to the reactor. Feeds are controlled in such a way as to maintain a targeted production rate and molar ratios of aluminum to SCA and TEAL to titanium. The catalyst is injected into the reactor through an injection tube that penetrates through the side of the reactor wall. Available catalyst injection points are at 2 meters and 6.4 meters above the distributor plate. Reactor temperature is controlled by adjusting cooling water to the heat exchanger in order to maintain a specific temperature measurement at a specific set-point. Usually this temperature is measured by thermowells positioned between 2 feet and 15 feet above the distributor plate and is maintained around 65° C. to 75° C.

Propylene, ethylene (in the case of ethylene random copolymer production) hydrogen, and nitrogen are continuously added to maintain the targeted total pressure and molar ratios of hydrogen to propylene and ethylene to propylene (in the case of ethylene random copolymer production). The total pressure and partial pressure of propylene are listed in the Table as well as the level of condensed liquid of the recycle stream entering the reactor and the production rate.

The resin product is transferred from the fluidized bed to a receiving drum continuously purged with humidified nitrogen.

The average residence time, based on production rate and reactor bed weight is approximately 1 hour.

In Example 1, propylene homopolymer is produced at a production rate of 24.6 ton/hr. The reactor temperature setpoint is 74.9° C. The recycle partial pressures of propylene, propane, hydrogen and nitrogen are given in Table 2. For these partial pressures the DPT is 71.0° C. and DPT+2° C.=73.0° C. The catalyst is injected at a height 2.0 meters above the plate. Temperatures are measured in the reactor at points A, B, C, D, F and F. Points B, C, D are positioned within the Region from the plate to 2.5 m above the plate, so inside the potential wet zone box as shown on FIG. 2. With the reactor conditions in this example, the temperature measured at Point B is 72.7° C., so below DPT+2° C. The temperatures at Points C and D are 73.6° C. and 73.5° C., so above DPT+2° C. Since some of the temperatures in the Region are outside the wet zone (see box in FIG. 2), no wet zone is established. The polypropylene powder produced has a settled bulk density of 23.4 lb/ft$^3$, which is relatively low.

In Example 2, propylene homopolymer is produced at a production rate of 21.0 ton/hr. The reactor temperature setpoint is reduced from Example 1 down to 70.1° C. The recycle partial pressures of propylene, propane, hydrogen and nitrogen are given in Table 2. For these partial pressures the DPT is 67.5° C. and DPT+2° C.=69.5° C. The catalyst is injected at a height 2 meters above the plate. Temperatures are measured in the reactor at points A, B, C, D, E and F. Points B, C, D are positioned in the potential wet zone box from the plate to 2.5 m above the plate. With the reactor conditions in this example, the temperature measured at Points B, C and D are all below DPT+2° C. Since all of the temperatures are inside the box (See FIG. 3), the wet zone is established. With the catalyst injection point located at 2.0 meters above the plate, the catalyst is fed into the wet zone. The polypropylene powder produced has a settled bulk density of 25.8 lb/ft$^3$, which is relatively high.

In Example 3, propylene homopolymer is produced at a production rate of 25.1 ton/hr. The reactor temperature setpoint is reduced from Example 1 to 73.2° C. The recycle partial pressures of propylene, propane, hydrogen and nitrogen are given in Table 2. For these partial pressures the DPT is 69.3° C. and DPT+2° C.=71.3° C. The catalyst is injected at a height 2 meters above the plate. Temperatures are measured in the reactor at points A, B, C, D, E and F. Points B, C, D are positioned in the potential wet zone box from the plate to 2.5 m above the plate. With the reactor conditions in this example, the temperature measured at Points B, C and D are all below DPT+2° C. Since all of the temperatures are inside the box (See FIG. 4), the wet zone is established. With the catalyst injection point located at 2.0 meters above the plate, the catalyst is fed into the wet zone. The polypropylene powder produced has a settled bulk density of 25.8 lb/ft$^3$, which is relatively high.

In comparative sample 4, propylene homopolymer is produced at a production rate of 17.3 ton/hr. The reactor temperature setpoint is 73.2° C. The recycle partial pressures of propylene, propane, hydrogen and nitrogen are given in Table 2. For these partial pressures the DPT is 67.8° C. and DPT+2° C.=69.8° C. The catalyst is injected at a height 3.6 meters above the plate. Temperatures are measured in the reactor at points A, B, C, D, E and F. Points B, C, D are positioned in the potential wet zone box from the plate to 2.5 m above the plate. With the reactor conditions in this example, the temperature measured at Points B, C and D are all below DPT+2° C. Since all of the temperatures are inside the box (See FIG. 5), the wet zone is established. However, with the catalyst injection point located at 3.6 meters above the plate, the catalyst is not injected into the wet zone. The polypropylene powder produced has a settled bulk density of 20.1 lb/ft$^3$, which is relatively low.

It is specifically intended that the present disclosure not be limited to the embodiments and illustrations contained herein, but include modified forms of those embodiments including portions of the embodiments and combinations of elements of different embodiments as come within the scope of the following claims.

What is claimed is:

1. A process for producing olefin-based polymer comprising:

providing a gas phase polymerization reactor comprising a distributor plate and a fluidizing medium having a dew point temperature (DPT), the fluidizing medium comprising one or more olefin monomers and from 5 wt % to 25 wt % of a condensed liquid;

forming, in the reactor, a wet zone by maintaining a temperature less than or equal to the DPT+2° C. in a region in the reactor defined as extending from the distributor plate to 2.5 meters above the distributor plate;

injecting a catalyst composition into the wet zone, the catalyst composition having a catalyst activity greater than 50 ton/kg;

contacting, in the wet zone under gas phase polymerization conditions, the catalyst composition with the one more monomers of the fluidizing medium; and forming particles of olefin-based polymer having a settled bulk density greater than 23.5 lb/ft$^3$.

2. The process of claim 1 comprising injecting the catalyst composition into the wet zone at a height where the reactor temperature is from 60° C. to 77° C.

3. The process of claim 1 comprising injecting the catalyst composition in the wet zone when the DPT is from 60° C. to less than 75° C.

4. The process of claim 1 comprising providing a fluidizing medium comprising propylene monomer and from 5 wt % to 25 wt % condensed liquid phase; and forming particles of propylene homopolymer having a settled bulk density from 23.5 lb/ft$^3$ to 27 lb/ft$^3$.

5. The process of claim 4 comprising contacting a Ziegler-Natta catalyst composition with the one more monomers of the fluidizing medium, the Ziegler-Natta catalyst composition having an internal electron donor comprising a substituted phenylene aromatic diester; and forming particles of propylene homopolymer having a settled bulk density greater than 25.0 lb/ft$^3$.

6. The process of claim 5 wherein the internal electron donor comprises 5-tert-butyl-3-methyl-1,2-phenylene dibenzoate.

7. The process of claim 6 wherein the catalyst composition comprises a procatalyst composition with an average particle size D(50) from 10 microns to 15 microns.

8. The process of claim 6 wherein the catalyst composition comprises a procatalyst composition with an average particle size D(50) from 25 microns to 30 microns.

* * * * *